United States Patent
Yu et al.

(10) Patent No.: US 10,413,862 B2
(45) Date of Patent: Sep. 17, 2019

(54) APPARATUS AND METHOD FOR ABSORBING A COMPONENT FROM A GAS MIXTURE USING ROTATING PACKED BED UNIT

(71) Applicants: NATIONAL TSING HUA UNIVERSITY, Hsinchu (TW); Chang Chun Plastics Co., Ltd., Taipei (TW); Chang Chun Petrochemical Co., LTD., Taipei (TW)

(72) Inventors: Cheng-Hsiu Yu, Hsinchu (TW); Chung-Sung Tan, Hsinchu (TW)

(73) Assignees: NATIONAL TSING HUA UNIVERSITY, Hsinchu (TW); Chang Chun Plastics Co., Ltd., Taipei (TW); Chang Chun Petrochemical Co., LTD., Taipei (TW)

( * ) Notice: Subject to any disclaimer, the term of this patent is extended or adjusted under 35 U.S.C. 154(b) by 0 days.

(21) Appl. No.: 16/036,959

(22) Filed: Jul. 17, 2018

(65) Prior Publication Data
US 2018/0318753 A1    Nov. 8, 2018

Related U.S. Application Data

(63) Continuation-in-part of application No. 15/149,181, filed on May 9, 2016.

(30) Foreign Application Priority Data

Dec. 8, 2015    (TW) .............................. 104141110 A

(51) Int. Cl.
*B01D 47/00* (2006.01)
*B01D 53/14* (2006.01)
*B01D 53/18* (2006.01)

(52) U.S. Cl.
CPC ......... *B01D 53/18* (2013.01); *B01D 53/1475* (2013.01); *B01D 53/1425* (2013.01);
(Continued)

(58) Field of Classification Search
None
See application file for complete search history.

(56) References Cited

U.S. PATENT DOCUMENTS 7,537,644 B2 *    5/2009   Park ................... B01D 19/0057
                                                          95/261
7,780,763 B2 *    8/2010   Tan ........................ B01D 15/02
                                                          95/107
(Continued)

FOREIGN PATENT DOCUMENTS

CN          2870957 Y       2/2007
CN        102049176 A       5/2011

OTHER PUBLICATIONS

Young Eun Kim et al, "Comparison of Carbon Dioxide Absorption in Aqueous MEA, DEA, TEA, and AMP Solutions", Bulletin of the Korean Chemical Society, published on Mar. 20, 2013, vol. 34, No. 3, pp. 783-787, published by Korean Chemical Society, Korea.

*Primary Examiner* — Amber R Orlando
*Assistant Examiner* — Phillip Y Shao
(74) *Attorney, Agent, or Firm* — CKC & Partners Co., LLC

(57) ABSTRACT

Provided herein is a method for absorbing $CO_2$ from a gas mixture. The method includes using an apparatus comprised of a first RPB unit and a second RPB unit. The first RPB unit and the second RPB unit are arranged to absorb $CO_2$ in a first gas stream and a second gas stream, respectively. A liquid $CO_2$-absorbent is supplied sequentially passing through the first RPB unit and the second RPB unit to absorb $CO_2$ in the first gas stream and the second gas stream. The liquid (Continued)

$CO_2$-absorbent is regenerated to produce a regenerated $CO_2$-absorbent. The regenerated $CO_2$-absorbent is transported to the first RPB unit.

14 Claims, 13 Drawing Sheets

(52) U.S. Cl.
CPC .............. *B01D 2252/20489* (2013.01); *B01D 2256/24* (2013.01); *B01D 2257/504* (2013.01); *B01D 2258/025* (2013.01); *B01D 2258/0283* (2013.01)

(56) References Cited

U.S. PATENT DOCUMENTS

| | | | |
|---|---|---|---|
| 2010/0319540 A1* | 12/2010 | Garcia Andarcia | ........................... B01D 53/1425 95/180 |
| 2011/0126715 A1* | 6/2011 | Kimura | .............. B01D 53/1475 96/242 |
| 2011/0131937 A1* | 6/2011 | Ming | ................ B01D 53/1475 55/474 |
| 2011/0274608 A1* | 11/2011 | Su | .................... C01B 33/10784 423/342 |
| 2011/0303088 A1* | 12/2011 | Dutra E Mello | ........ B01D 3/08 95/151 |
| 2012/0175241 A1* | 7/2012 | Strand | ............... B01D 19/0015 203/49 |
| 2013/0319235 A1* | 12/2013 | Wolf | ........................ B01D 3/30 95/151 |
| 2014/0251910 A1* | 9/2014 | Watters | .................. C02F 9/005 210/652 |

* cited by examiner

US 10,413,862 B2

APPARATUS AND METHOD FOR ABSORBING A COMPONENT FROM A GAS MIXTURE USING ROTATING PACKED BED UNIT

RELATED APPLICATIONS

This application is a Continuation-in-part of U.S. application Ser. No. 15/149,181, filed on May 9, 2016, which claims priority to Taiwan Application Serial Number 104141110, filed on Dec. 8, 2015, the disclosures of which are incorporated herein by reference in their entireties.

BACKGROUND

Technical Field

The present disclosure relates to an apparatus for absorbing a component from a gas mixture.

Description of Related Art

Booming industrial activities have leaded to a lot of greenhouse gas being discharged into atmosphere, and that causes global warming. Typical greenhouse gases include carbon dioxide ($CO_2$), methane ($CH_4$), nitrous oxide ($N_2O$), sulfur hexafluoride ($SF_6$), etc., in which $CO_2$ exhibits the most serious impact. According to certain researches, the concentration of $CO_2$ in the atmosphere has raised from 280 ppm, prior to the Industrial Revolution, upto 395 ppm now, and is still increasing by the rate of about 2 ppm per year. Fossil fuels provide more than 85% of global electricity, but are also a major source of $CO_2$ emission, in which coal-fired power plants contribute to 43% of total $CO_2$ emission. In view of the above, there exists a need to develop more cost-effective and available technologies for removing $CO_2$ and other greenhouse gases from the exhaust gases of power plants.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DESCRIPTION OF THE EMBODIMENTS

Figure 1:
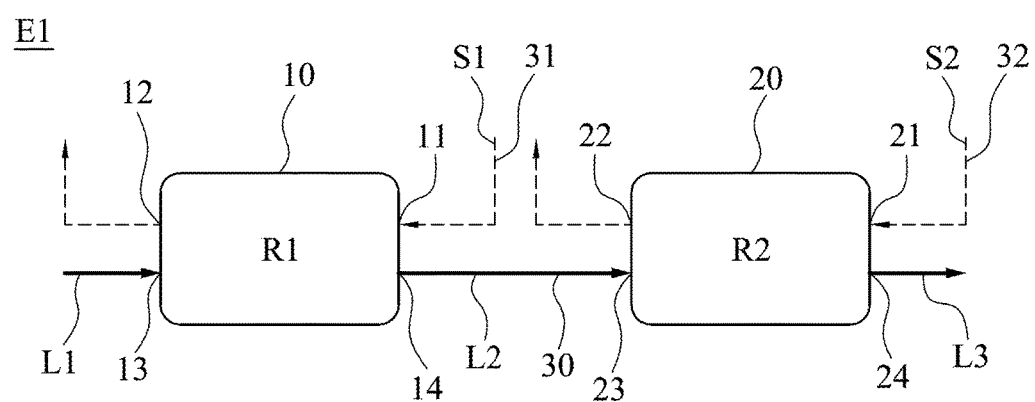
FIG. 1 is schematic diagram illustrating an apparatus for absorbing a component gas from a gas mixture according to various embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The present disclosure generally relates to an apparatus, equipment or a system for absorbing a component from a gas mixture. More specifically, the apparatus, equipment or system disclosed herein may absorb greenhouse gases such as $CO_2$, or other gases, from a gas mixture. In the present disclosure, $CO_2$ is taken as an illustrative example to adequately describe the function of each element of the apparatus and the details of the operation thereof. One skilled in the art realizes that, according to the following disclosure, the apparatus, equipment or system disclosed herein may be applied in the absorption of other types of gases, such as ozone, methane, nitrous oxide, chlorofluorocarbons, perfluorocarbons, hydrogenfluorocarbons and other greenhouse gases, or other gases. Therefore, the apparatus, equipment or system disclosed herein is not limited to the absorption of $CO_2$. For example, by selecting different absorbents, the apparatus disclosed herein may be applied to absorb other gases.

FIG. 1 is schematic diagram illustrating an apparatus E1 for absorbing a component gas from a gas mixture according to various embodiments of the present disclosure. The apparatus E1 includes a first rotating packed bed (RPB) unit R1 and a second RPB unit R2. The first RPB unit R1 is configured for absorbing a component gas such as for example $CO_2$ or other gases in a first gas stream S1. Similarly, the second RPB unit R2 is configured for absorbing a component gas such as for example $CO_2$ or other gases in a second gas stream S2. The first gas stream S1 and the second gas stream S2 are respectively supplied to the first RPB unit R1 and the second RPB unit R2 through respective piping.

Figure 2:
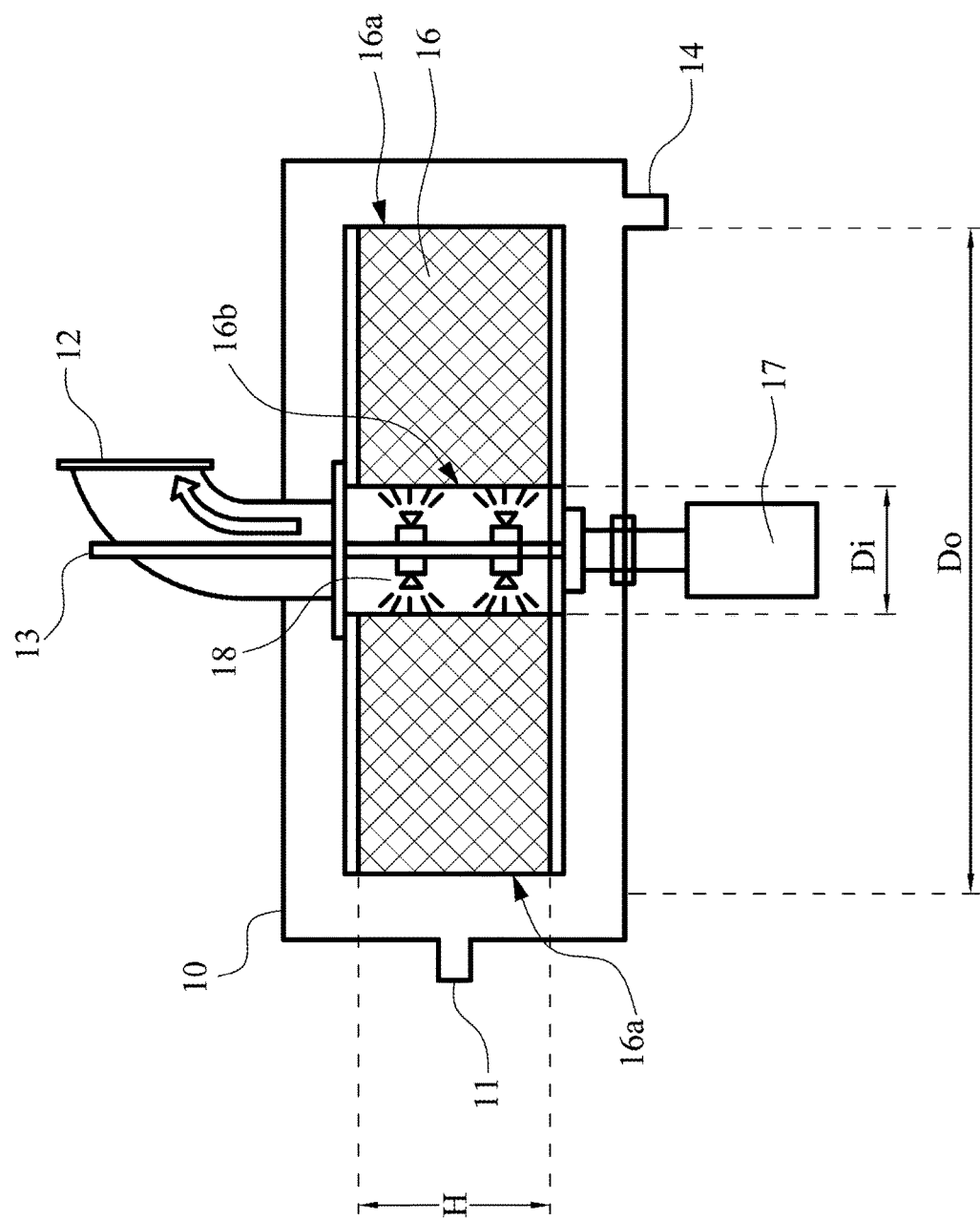
FIG. 2 is cross-sectional view schematically illustrating the first RPB unit R1 according to one embodiment of the present disclosure.

FIG. 2 is cross-sectional view schematically illustrating the first RPB unit R1 according to one embodiment of the present disclosure. With reference to FIG. 1 and FIG. 2, the first RPB unit R1 includes a housing 10, a first gas inlet 11, a first gas outlet 12, a first absorbent inlet 13, and first absorbent outlet 14. The first gas stream S1 is supplied or injected into the first RPB unit R1 from the first gas inlet 11.

The first RPB unit R1 further includes a first RPB 16, which is capable of rotating in the housing 10. There is no specific limitation on the devices or means for driving the first RPB 16 into rotation. For example, a driving device 17 such as an electrical motor and the like may be employed to drive the first RPB 16 into rotation. In some embodiment, the first RPB 16 includes a number of inert fillers packed therein, and voids or pores exist between and/or in the inert fillers.

The configuration of the first gas inlet 11, the first RPB 16 and the first gas outlet 12 allows the first gas stream S1 containing $CO_2$, for example, is transported from the first gas inlet 11 through the first RPB 16 to the first gas outlet 12. For example, the first gas stream S1 is supplied into the first RPB unit R1 from the first gas inlet 11, and transported from the outer side 16a of the first RPB 16 into the interior of the first RPB 16. Further, the first gas stream passes through the inner side 16b of the first RPB 16, and exits the first RPB unit R1 from the first gas outlet 12. It is noted that the first RPB unit R1 of the present disclosure is not limited to the counter-flow type of the RPB unit depicted in FIG. 1, and cross-flow types or other types of RPB units, for example, may also be used in the present disclosure.

In the first RPB unit R1, the first absorbent inlet 13, the first RPB 16 and the first absorbent outlet 14 are configured to allow the absorbent to be transported from the first absorbent inlet 13 to the first absorbent outlet 14 through the first RPB 16. For instance, a liquid absorbent L1 is supplied or injected into the interior of the first RPB 16 from the first absorbent inlet 13. When the first RPB 16 is rotated at a high speed, the liquid absorbent moves from the inner side 16b of the first RPB 16 to the outer side 16a by the centrifugal force, and is further dispersed into small droplets or liquid film. The liquid absorbent contacts the gas stream containing $CO_2$, for example, in the void of the first RPB 1, and therefore the liquid absorbent efficiently absorbs the component such as $CO_2$ of the first gas stream S1. In one embodiment, the first RPB 16 is a high-gravity rotating packed bed, which is capable of generating a gravitational field greater than 100 G by rotation at a high speed. In another embodiment, the liquid absorbent is sprayed through a dispenser 18 into the inner side 16b of the first RPB 16.

Referring back to FIG. 1, the second RPB unit R2 is similar to the first RPB unit R1 in structure. Briefly, the second RPB unit R2 includes a housing 20, a second gas inlet 21, a second gas outlet 22, a second absorbent inlet 23, and a second absorbent outlet 24. The second RPB unit R2 further includes a second RPB (not shown in FIG. 1) capable of rotating in the housing 20. The second gas stream S2 is transported from the second gas inlet 21 through the second RPB to the second gas outlet 22. The liquid absorbent L2 flows from the second absorbent inlet 23 through the second RPB to the second absorbent outlet 24.

It is noted that some features of the present disclosure relies on the connection relationship between the first and second RPB units R1, R2 and the transportation paths of the liquid absorbent, the first gas stream S1 and the second gas stream S2. In particular, the first and second RPB units R1, R2 respectively absorb $CO_2$ in the first gas stream S1 and the second gas stream S2, but the liquid absorbent L1 sequentially passes through the first RPB unit R1 and the second RPB unit R2. More specifically, the first gas stream S1 is transported through the first piping 31 to the first gas inlet 11, the second gas stream S2 is transported through the second piping 33 to the second gas inlet 21. In some embodiments, the first piping 31 is free of connection with the second gas outlet 22, and the second piping 32 is free of connection with the first gas outlet 12. The liquid absorbent L1 is supplied into the first RPB unit R1 from the first absorbent inlet 13, absorbing the $CO_2$ of the first gas stream S1, and then exits the first RPB unit R1 from the first absorbent outlet 14. The first absorbent outlet 14 of the first RPB unit R1 communicates and/or connects with the second absorbent inlet 23 of the second RPB unit R2. For example, piping 30 is arranged to interconnect the first absorbent outlet 14 with the second absorbent inlet 23. Therefore, the liquid absorbent L2 having passed through the first RPB unit R1 is transported into the second RPB unit R2 from the second absorbent inlet 23, absorbing the $CO_2$ of the second gas stream S2, and then exits the second RPB unit R2 from the second absorbent outlet 24. The $CO_2$ "loading" (lean/rich loading, unit: mol $CO_2$/mol absorbent) of the liquid absorbent L2 is greater than that of the liquid absorbent L1 because the liquid absorbent L2 has absorbed the $CO_2$ of the first gas stream S1 in the first RPB unit R1. Similarly, the $CO_2$ loading of the liquid absorbent L3 is greater than that of the liquid absorbent L2 because the liquid absorbent L3 has absorbed $CO_2$ of the second gas stream S2 in the second RPB unit R2. According to various embodiments of the present disclosure, the $CO_2$ loading of the liquid absorbent passing through the first RPB unit R1 is substantially equal to that of the liquid absorbent entering the second RPB unit R2. For the purpose of simplifying the drawing, the solid lines indicated by L1, L2, and L3 in FIG. 1 also represent the piping for transporting the corresponding liquid absorbents. The dashed lines indicated by S1 and S2 also represent the piping for transporting the corresponding gas streams.

According to various embodiments of the present disclosure, the composition of the first gas stream S1 may be the same as or different from that of the second gas stream S2. In one embodiment, the first gas stream S1 and the second gas stream S2 have the same $CO_2$ concentration. In another embodiment, the $CO_2$ concentration of the first gas stream S1 is greater than that of the second gas stream S2. In still another embodiment, the $CO_2$ concentration of the first gas stream S1 is less than that of the second gas stream S2.

In some embodiment, the volumetric percentages of $CO_2$ in the first gas stream S1 and/or the second gas stream S2 are about 1-30 vol. %. In examples, the first gas stream S1 and/or the second gas stream S2 may be the discharged or exhaust gas from coal-fired power plants, natural gas power plants or steel manufacturing plants, for example. According to some embodiments of the present disclosure, the first gas outlet 12 of the first RPB unit R1 and the second gas outlet 22 of the second RPB unit R2 directly communicate with the atmospheric environment, and the first and second gas streams S1, S2 having processed or treated by first and second RPB units R1, R2 may be discharged into the atmospheric environment. In other embodiments, the first gas outlet 12 and/or second gas outlet 22 may be connected to other apparatuses or reaction unit.

Hereinafter, various embodiments and comparative examples of the present disclosure are described in detail such that one skilled in the art may implement the embodiments of the present disclosure, and may understand the outstanding technical effect provided by the present disclosure. The embodiments and comparative examples described below should not be construed as limits to the present disclosure in any manner.

Example 1 and Example 2

In Examples 1 and 2, the apparatus illustrated in FIG. 1 and FIG. 2 was used to absorb $CO_2$. The first and second RPB units R1, R2 are of the same structure and dimension, the detailed specifications of the first and second RPB units R1, R2 are shown in Table 1 below. Both the first and second RPB units R1, R2 were operated at a rotating speed of 1600 rpm and at a temperature of 50° C. Monoethanolamine (MEA, 40.8 wt %) was used as the liquid absorbent, and the flow rate of MEA was 50 mL/min. In Example 1, the flow rates of the first gas stream S1 and the second gas stream S2 were respectively 4.6 and 3.6 L/min. The volumetric percentage (vol. %) of carbon dioxide (hereinafter referred to as "$CO_2$") in the first gas stream S1 and the second gas stream S2 were 10 vol. % (the remainder was nitrogen). The resulted $CO_2$ capture percentages of the first and second RPB units R1, R2 were respectively 90.9% and 88.8%. In Example 2, the flow rates of the first gas stream S1 and the second gas stream S2 were respectively 6.5 and 4.8 L/min, and the resulted $CO_2$ capture percentages of the first and second RPB units R1, R2 were respectively 84.8% and 80.9%. The crucial parameters and the experimental results of Examples 1 and 2 are summarized in Table 2 below. In the present disclosure, while a pressure condition for a certain quantity is not specified, the pressure condition refers to approximately 1 atm. In Table 2, the $CO_2$ capture percentage of each RPB unit is calculated by Formula (1) below.

$$A = \frac{C_{in} - C_{out}}{C_{in}} \times 100\% \qquad \text{Formula (1)}$$

In Formula (1), "A" represents a CO2 capture percentage, "$C_{in}$" represents the $CO_2$ concentration in the feed gas stream, and "$C_{out}$" represents the $CO_2$ concentration in the discharged gas stream.

TABLE 1

| | |
|---|---|
| RPB outer diameter (Do, cm) | 12.5 |
| RPB inner diameter (Di, cm) | 2.5 |
| RPB height (H, cm) | 2.3 |
| RPB volume (V, cm³) | 270.1 |
| Surface area of the inert fillers (m²/m³) | 887.6 |

TABLE 2

| | Example 1 | | Example 2 | |
|---|---|---|---|---|
| | Experimental data | Simulation result | Experimental data | Simulation result |
| Flow rate of first gas stream S1 (L/min) | 4.6 | — | 6.5 | — |
| $CO_2$ concentration of first gas stream S1 (vol. %) | 10 | | 10 | |
| Flow rate of second gas stream S2 (L/min) | 3.6 | — | 4.8 | — |
| $CO_2$ concentration of second gas stream S2 (vol. %) | 10 | | 10 | |
| Flow rate of the liquid absorbent (mL/min) | 50 | — | 50 | — |
| $CO_2$ capture percentage of R1(%) | 90.9 | 90.1 | 84.8 | 80.8 |
| $CO_2$ loading of liquid absorbent L1 (mol $CO_2$/molMEA) | 0.334 | 0.345 | 0.334 | 0.345 |
| $CO_2$ capture percentage of R2 (%) | 88.8 | 90.6 | 80.9 | 80.6 |
| $CO_2$ loading of liquid absorbent L2 (mol $CO_2$/mol MEA) | 0.381 | 0.392 | 0.396 | 0.405 |

Table 2 further lists the "simulation result" of Examples 1 and 2, and the principle and details of the simulation approach are described in the following journal papers authored by the inventors of present disclosure, each of which is hereby incorporated by reference in its entirety:
1. Hsu-Hsiang Cheng, Chung-Sung Tan, Separation and Purification Technology, 82 (2011) 156-166.
2. Cheng-Hsiu Yu, Hsu-Hsiang Cheng, Chung-Sung Tan, International Journal of Greenhouse Gas Control, 9 (2012), 136-147.

Hereinafter, the simulation approach mentioned above is referred to as "6-tank in series model". In accordance with the experimental data and simulation results of Examples 1 and 2 in Table 2, the $CO_2$ capture percentage and the $CO_2$ loading of the liquid absorbent of the RPB unit can be precisely simulated and calculated using the "6-tank in series model."

Example 3

The "6-tank in series model" was employed to simulate and calculate the total amount of processed gas (i.e., sum of the flow rates of the first and second gas streams S1, S2) and the $CO_2$ loading of the liquid absorbent in apparatus E illustrated in FIG. 1 at $CO_2$ capture percentages of 90%, 80%, 70% and 60%. As to the simulation conditions of Example 3, the initial $CO_2$ loading of the liquid absorbent L1 was set to 0.345 while the other conditions were the same as these described in Example 1. After obtaining the $CO_2$ loading of the liquid absorbent L3, commercial simulation software "Aspen Plus" was applied to simulate the energy consumption required for regenerating the liquid absorbent (hereinafter referred to as "regeneration energy consumption"). The simulating conditions for the "regeneration energy consumption" are set at a temperature of 120° C. and in a pressure of 2 atm. FIGS. 11-14 are diagrams showing the total amount of processed gas and the regeneration energy consumption in Example 3 and comparative examples 1-7 at different $CO_2$ capture percentages (e.g., 90%, 80%, 70% and 60%). The results illustrated in FIGS. 11-14 are described in detail hereinafter.

Comparative Example 1-7

FIGS. 3-9 are schematic diagrams illustrating apparatuses C1-C7 for absorbing $CO_2$ according to comparative examples 1-7 of the present disclosure. In comparative examples 1-7, several combinations selected from a RPB unit and/or a fixed packed bed and a variety of connections there between are provided. Comparative examples 1-7 and Example 3 were simulated at the same volume of packed beds. Specifically, in comparative examples 1-7 and Example 3, the total volumes of the packed bed(s) of the apparatuses were the same as each other. In addition, the "6-tank in series model" was used to simulate the $CO_2$ capture percentage and the $CO_2$ loading of the liquid absorbent for RPB Units in comparative examples 1-7. As to the fixed packed beds, commercial software "Aspen Plus" was used to simulate the $CO_2$ capture percentage and the $CO_2$ loading of the liquid absorbent. Thereafter, the regeneration energy consumptions of the liquid absorbents in comparative examples 1-7 were calculated using software Aspen Plus.

Figure 3:
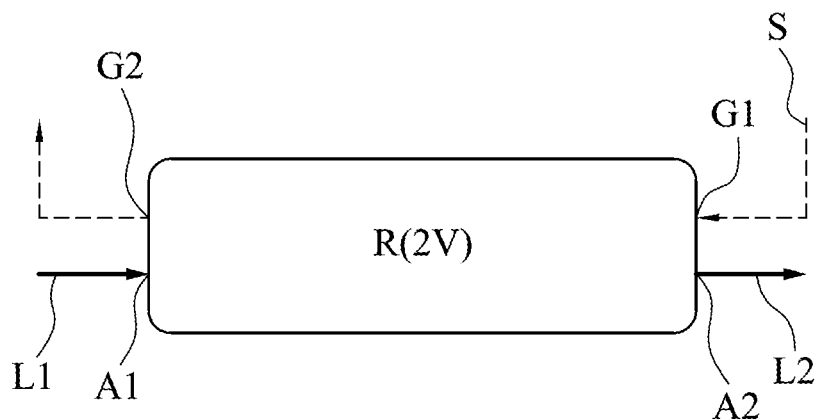
FIGS. 3-10 are schematic diagrams illustrating apparatuses for absorbing $CO_2$ according to comparative examples 1-8 of the present disclosure.

In comparative example 1, as shown in FIG. 3, the apparatus C1 includes a single RPB unit R(2V) only, but the volume of the packed bed of the RPB unit R(2V) is twice the volume of the packed bed of the first RPB unit R1 (or the second RPB unit R2) in Example 3. That is, the total volume of the packed bed in the RPB unit R(2V) equals the total volume of the packed beds of the first and second RPB units R1, R2 in Example 3. The gas stream S to be processed is supplied into the RPB unit R(2V) from the gas inlet G1, and then exits the RPB unit R(2V) from the gas outlet G2. The liquid absorbent L1 is supplied into the RPB unit R(2V) from the absorbent inlet A1. The liquid absorbent L2, having passed through the RPB unit R(2V), is discharged from the absorbent outlet A2. Other simulation parameters are the same as these described in Example 3. In the conditions described above, the total amount of processed gas, the CO2 loading of the liquid absorbent L2, and the regeneration energy consumption of the liquid absorbent L2 were simulated and calculated at CO2 capture percentages of 90%, 80%, 70% and 60%.

Figure 4:
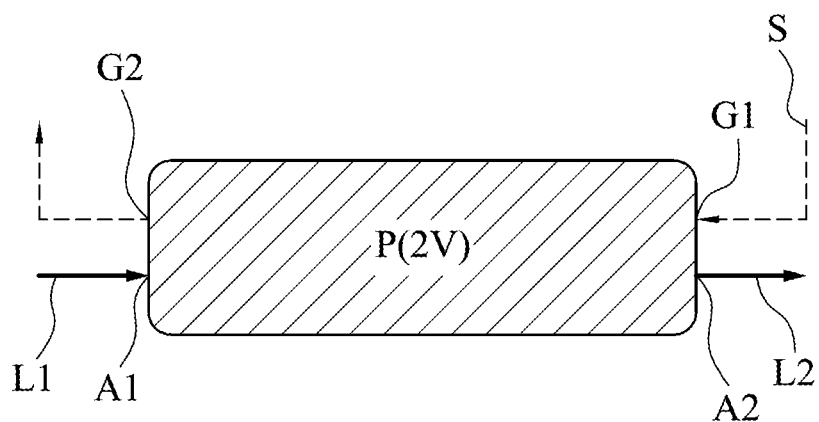

In comparative example 2, as shown in FIG. 4, the apparatus C2 includes a single fix packed bed (FPB) unit P(2V) only, but the volume of the packed bed of the FPB unit P(2V) is twice the volume of the packed bed of the first RPB unit R1 (or the second RPB unit R2) in Example 3. That is, the total volume of the packed bed in FPB unit P(2V) equals the total volume of the packed beds of the first and second RPB units R1, R2 in Example 3. Gas stream S to be processed is supplied into the FPB unit P(2V) from the gas inlet G1, and then exits the FPB unit P(2V) from the gas outlet G2. The liquid absorbent L1 is supplied into the FPB unit P(2V) from the absorbent inlet A1. The liquid absorbent L2, having passed through the FPB unit P(2V), is discharged from the absorbent outlet A2. Other simulation parameters are the same as these described in Example 3. In the conditions described above, the total amount of processed gas, the CO2 loading of the liquid absorbent L2, and the regeneration energy consumption of the liquid absorbent L2 were simulated and calculated at CO2 capture percentages of 90%, 80%, 70% and 60%.

Figure 5:
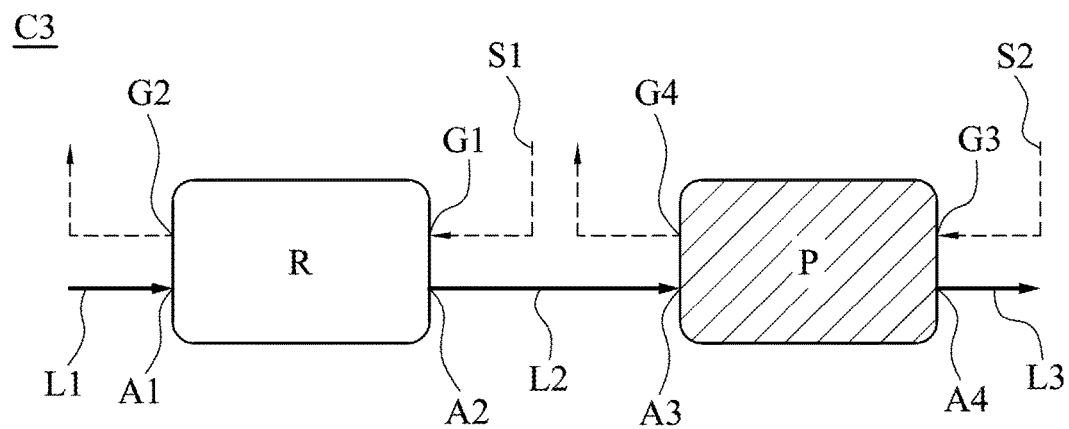

In comparative example 3, as shown in FIG. 5, the apparatus C3 includes a RPB unit R and a FPB unit P. The RPB unit R is the same as the first RPB unit R1 of Example 3, and the volume of the packed bed in the FPB unit P is the same as the volume of the packed bed in the RPB unit R2 (or R1) of Example 3. The RPB unit R is configured to absorb $CO_2$ in the first gas stream S1, whereas the FPB unit P is configured to absorb $CO_2$ in the second gas stream S2. The first gas stream S1 is supplied into the RPB unit R from the gas inlet G1, and then exists from the gas outlet G2. The second gas stream S2 is supplied into the FPB unit P from the gas inlet G3, and then exists from the gas outlet G4. The liquid absorbent L1 is supplied into the RPB unit R from the absorbent inlet A1, and then exits the RPB unit R from the absorbent outlet A2. The liquid absorbent L2 having passed through the RPB unit R is transported into FPB unit P from the absorbent inlet A3. The liquid absorbent L3 with absorbed CO2 exits the FPB unit P from the absorbent outlet A4. Other simulation parameters are the same as these described in Example 3. In the conditions described above, the total amount of processed gas, the $CO_2$ loading of the liquid absorbent L3, and the regeneration energy consumption of the liquid absorbent L3 were simulated and calculated at $CO_2$ capture percentages of 90%, 80%, 70% and 60%.

Figure 6:
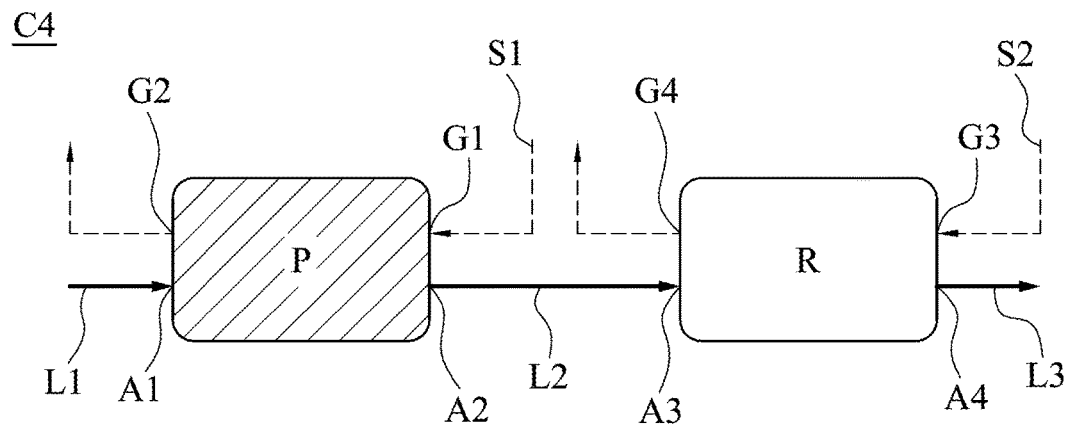

In comparative example 4, as shown in FIG. 6, the apparatus C4 includes a RPB unit R and a FPB unit P. The apparatus C4 of the comparative example 4 is similar to the apparatus C3 of comparative example 3, except that the liquid absorbent in comparative example 4 passes through the FPB unit P first, and later passes through the RPB unit R. Other simulation parameters of comparative example 4 are the same as comparative example 3.

Figure 7:
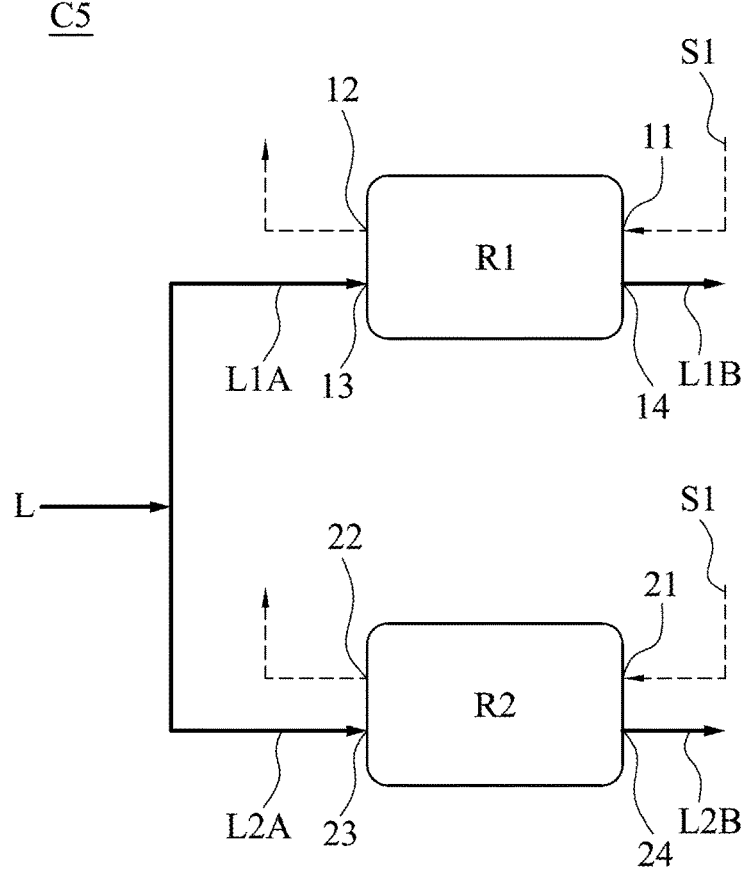

In comparative example 5, as illustrated in FIG. 7, the apparatus C5 includes a RPB unit R1 and a RPB unit R2. The RPB unit R1 and RPB unit R2 respectively process the first gas stream S1 and the second gas stream S2. The structure and dimension of the RPB Units R1 and R2 are the same as these of Example 3. However, the liquid absorbent L is evenly split into two liquid absorbents L1A and L2A, and the liquid absorbents L1A and L2A are respectively transported into RPB units R1 and R2 to absorb $CO_2$ in the first gas stream S1 and the second gas stream S2. The total volumetric flow rate of the liquid absorbents L1A and L2A is equal to the volumetric flow rate of the liquid absorbent L1 in Example 3. Other simulation parameters are the same as these described in Example 3. In the conditions described above, the total amount of processed gas, the $CO_2$ loadings of the liquid absorbents L1B and L2B, and the regeneration energy consumption of the absorbents L1B and L2B were simulated and calculated at $CO_2$ capture percentages of 90%, 80%, 70% and 60%.

Figure 8:
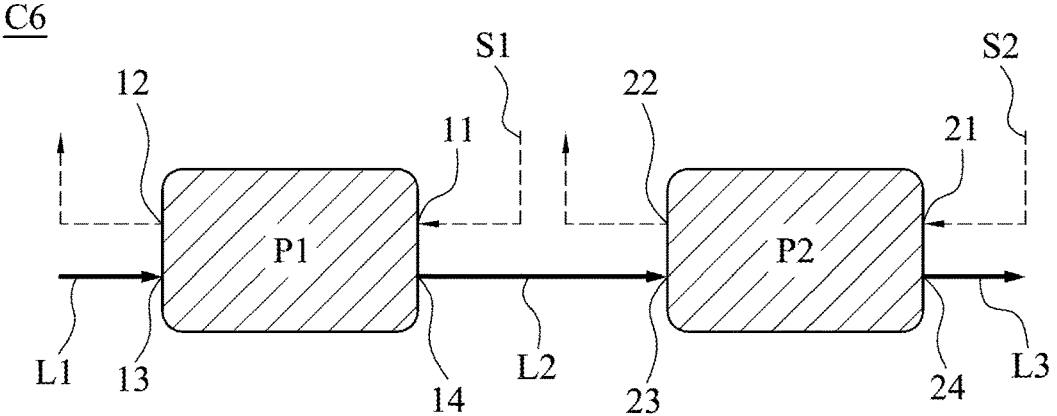

In comparative example 6, as shown in FIG. 8, the apparatus C6 includes a FPB unit P1 and a FPB unit P2. The FPB unit P1 and the FPB unit P2 respectively process the first gas stream S1 and the second gas stream S2, but the liquid absorbent sequentially passes through the FPB unit P1 and the FPB unit P2. The volume of the packed bed in the FPB unit P1 (or P2) is the same as the volume of the packed bed in the RPB unit R1 (or R2) in Example 3. Other simulation parameters are the same as these described in Example 3. In the conditions described above, the total amount of processed gas, the $CO_2$ loading of the liquid absorbent L3, and the regeneration energy consumption of the liquid absorbent L3 were simulated and calculated at $CO_2$ capture percentages of 90%, 80%, 70% and 60%.

Figure 9:
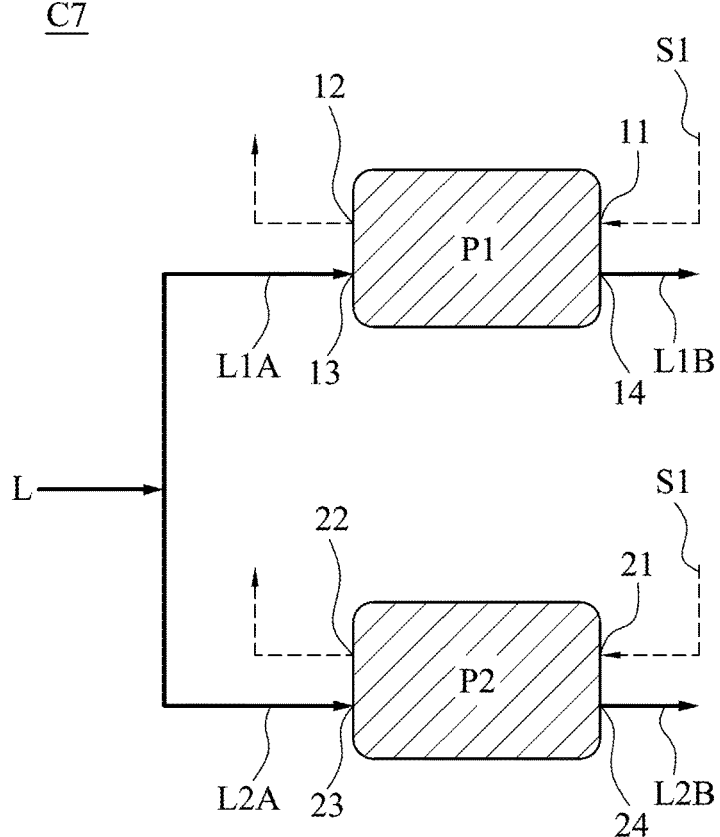

In comparative example 7, as illustrated in FIG. 9, the apparatus C7 includes a FPB unit P1 and a FPB unit P2. The FPB unit P1 and the FPB unit P2 respectively process the first gas stream S1 and the second gas stream S2. The liquid absorbent L is evenly split into two liquid absorbents L1A and L2A, and the liquid absorbents L1A and L2A are respectively transported into FPB units P1 and P2 to absorb CO2 in the first gas stream S1 and the second gas stream S2. The total volumetric flow rate of the liquid absorbents L1A and L2A is equal to the volumetric flow rate of the liquid absorbent L1 in Example 3. Other simulation parameters are the same as these described in Example 3. In the conditions described above, the amount of processed gas, the $CO_2$ loadings of the liquid absorbents L1B and L2B, and the regeneration energy consumption of the liquid absorbents L1B and L2B were simulated and calculated at $CO_2$ capture percentages of 90%, 80%, 70% and 60%.

Figure 11:
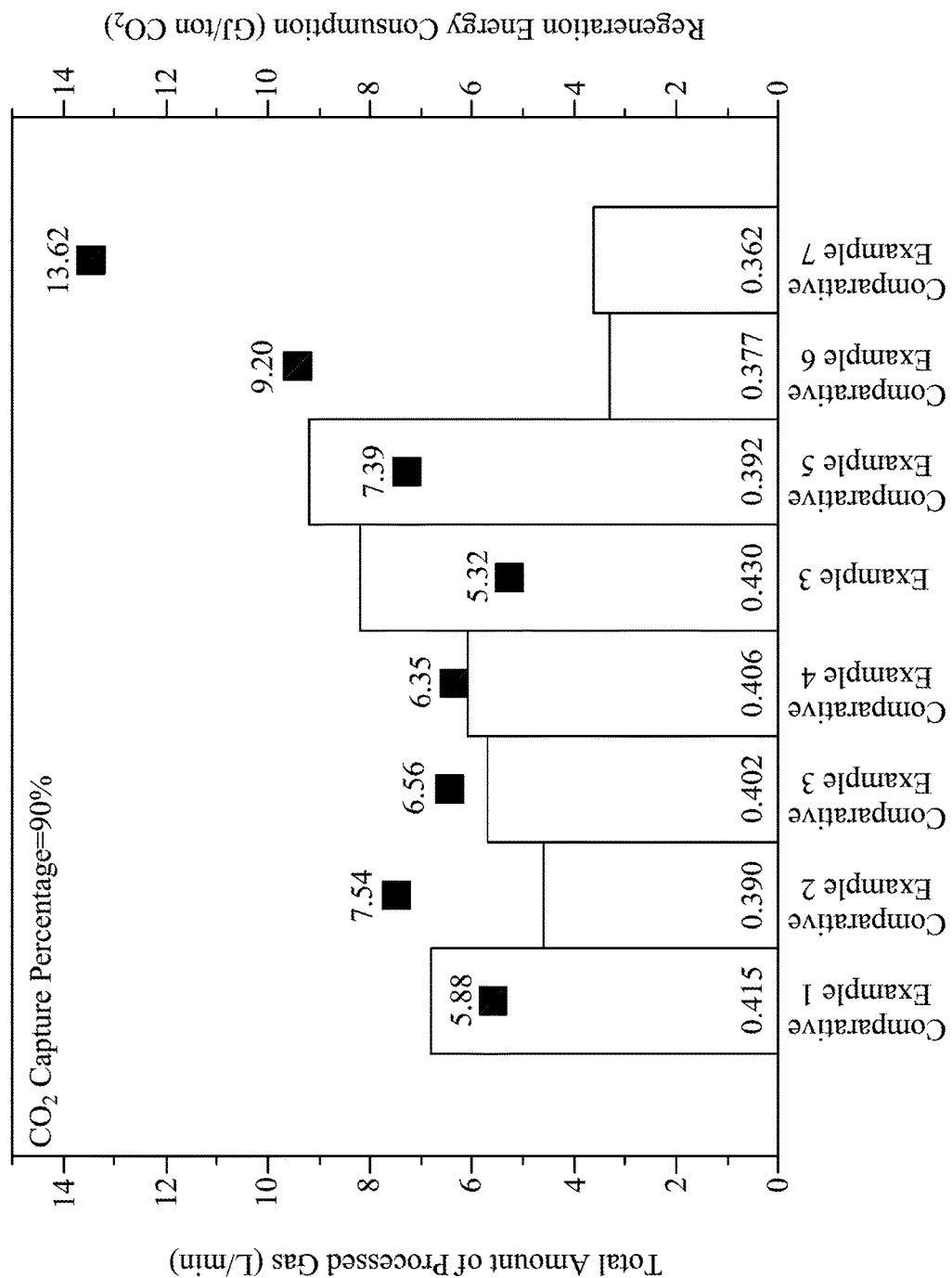
FIGS. 11-14 are diagrams showing the total amount of processed gas and the regeneration energy consumption of the liquid absorbent at different $CO_2$ capture percentage (e.g., 90%, 80%, 70% and 60%) associated with the apparatuses of Example 3 and comparative examples 1-7 of the present disclosure.
Figure 12:
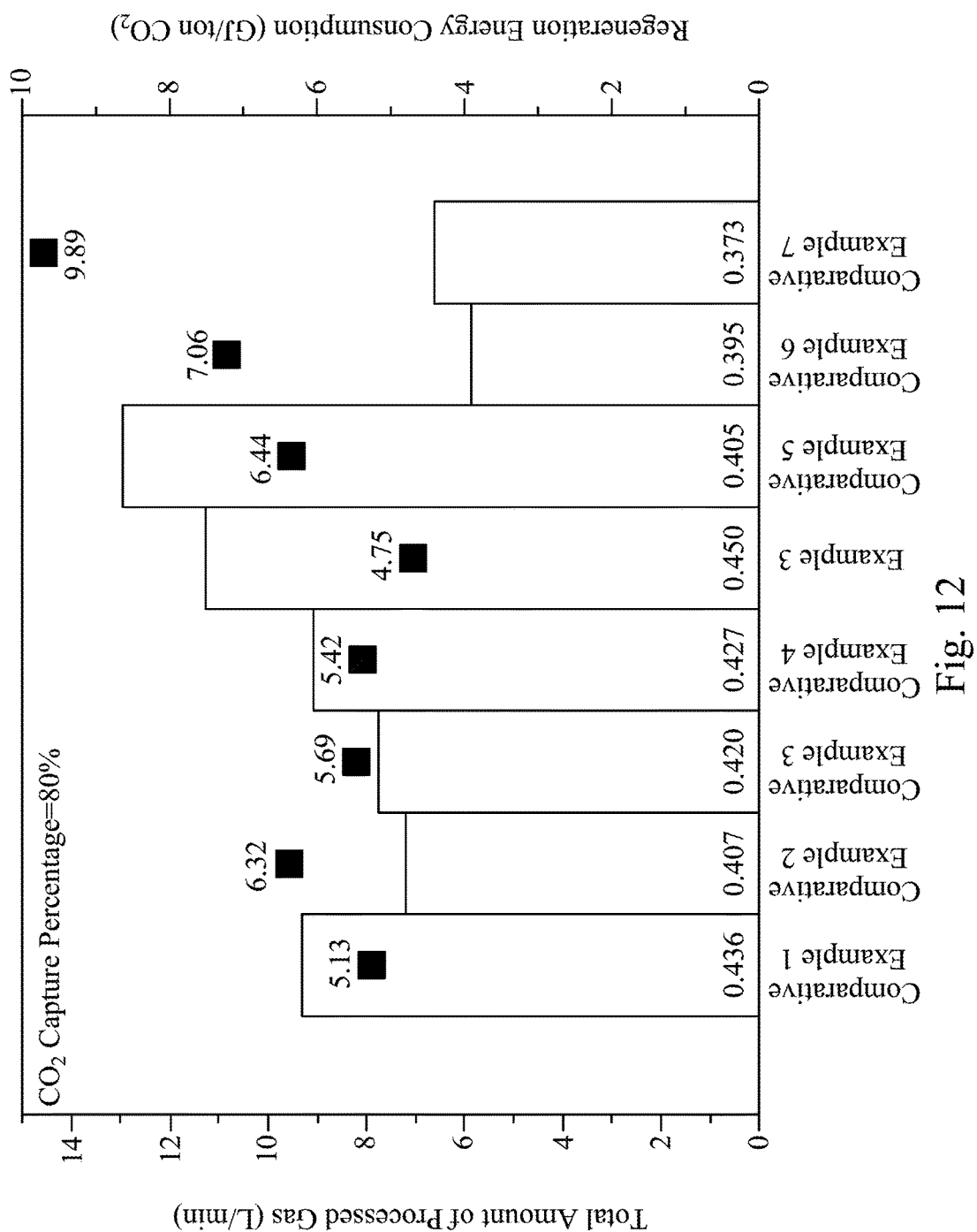
Figure 13:
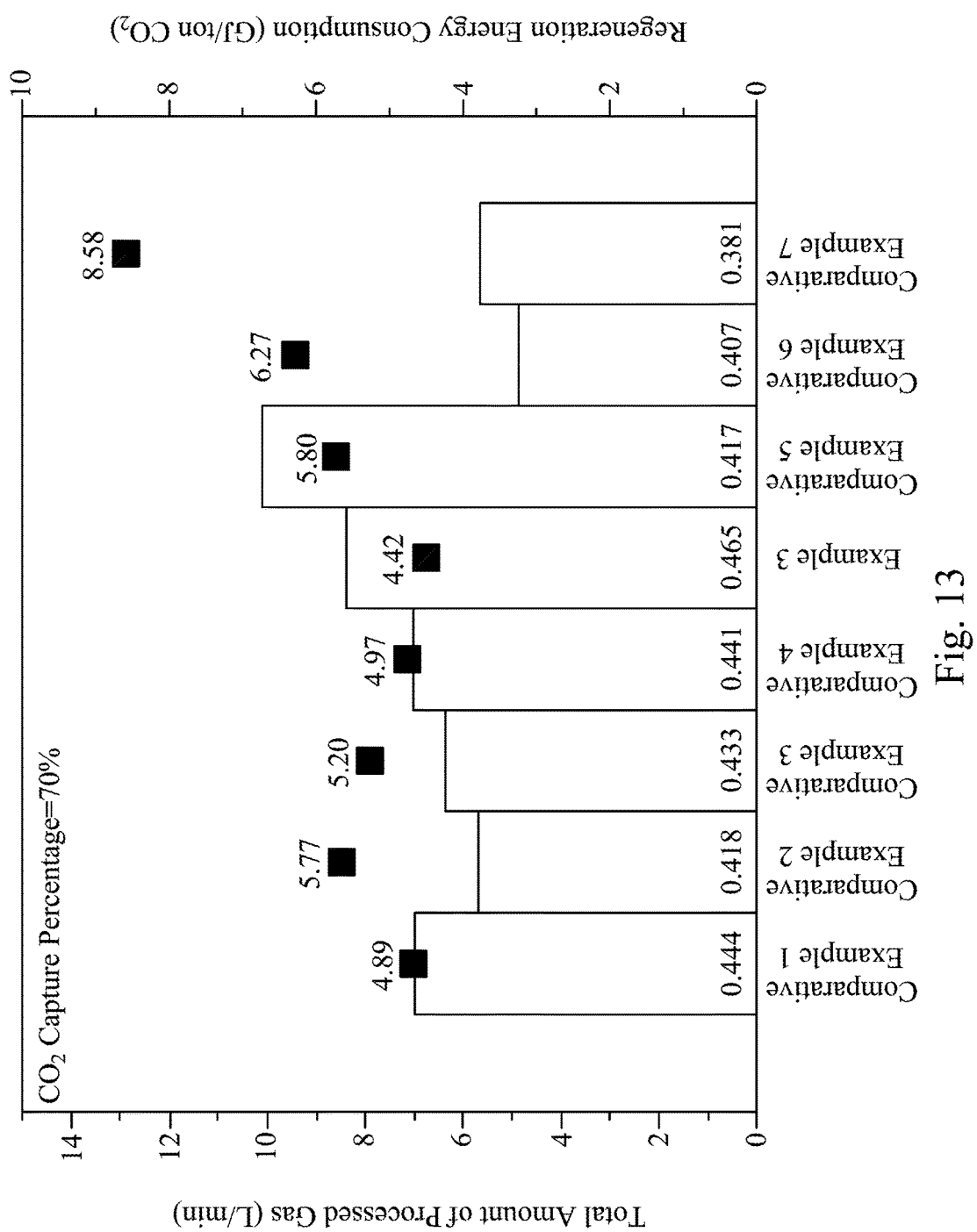
Figure 14:
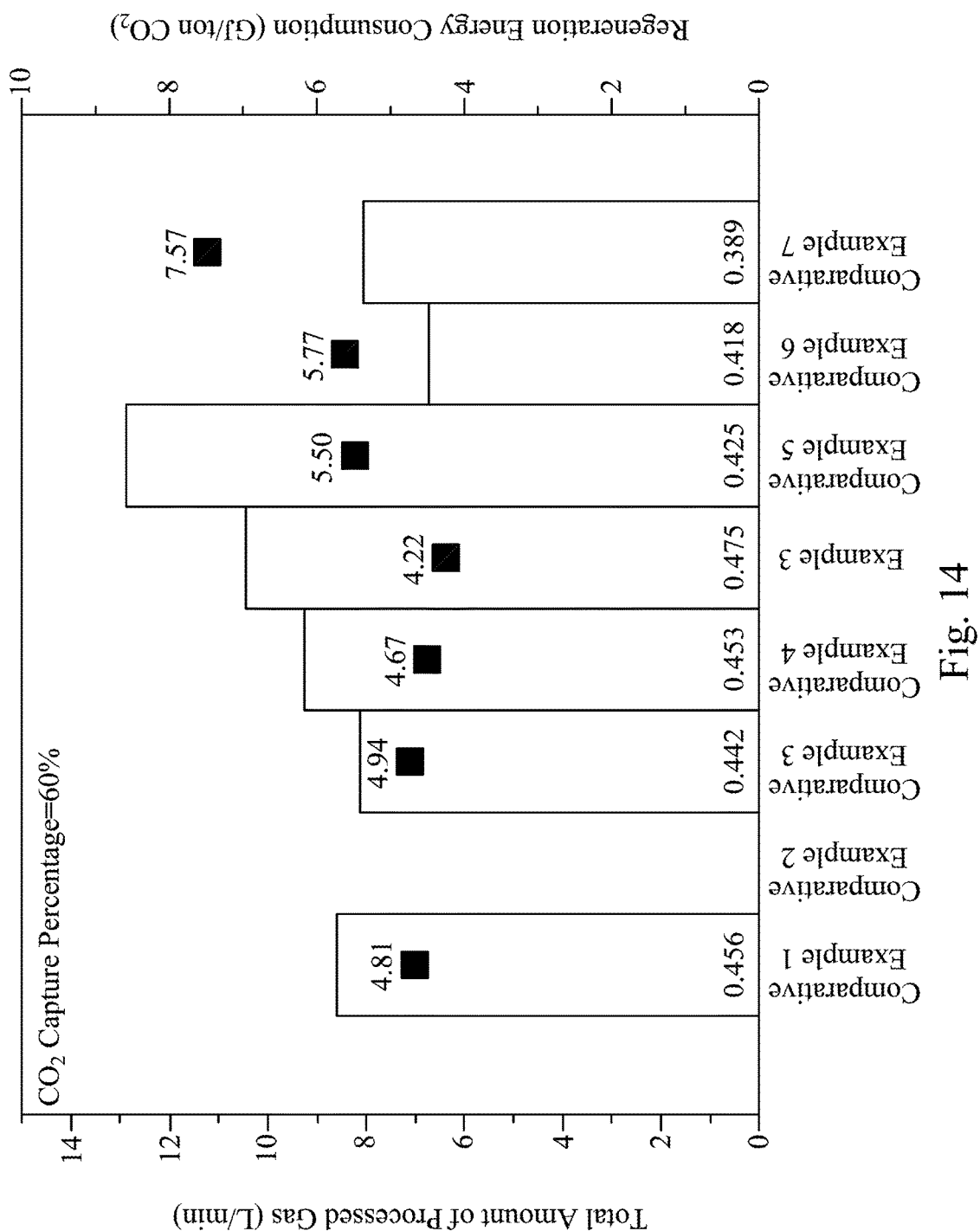

FIG. 11 shows the simulation results of the total amount of processed gas and regeneration energy consumption of the liquid absorbent when the CO2 capture percentage is 90% associated with each of the apparatuses in Example 3 and comparative examples 1-7 of the present disclosure. In FIG. 11, the stripe patterns represent the total amount of processed gas, and the symbols "■" represent the regeneration energy consumptions. The numbers above the lateral axis of FIG. 11 indicate the CO2 loadings (rich loading) of the liquid absorbents. In FIG. 11, it may be observed that Example 3 exhibits the lowest regeneration energy consumption, only about 5.32 GJ/ton $CO_2$. In addition, the total amount of processed gas in Example 3 is about 8.2 L/min, whereas comparative example 5 shows the largest amount of processed gas, approximately 9.2 L/min. Although the total amount of processed gas in Example 3 is slightly less than that of comparative example 5, the regeneration energy consumption of Example 3 is considerably less than that of comparative example 5. Further, the total amount of processed gas of Example 3 is still greater than that of comparative examples 1-4, 6 and 7. FIGS. 12-14 shows the simulation results of the total amount of processed gas and regeneration energy consumption of the liquid absorbent when the CO2 capture percentages are respectively 80%, 70% and 60% associated with each of the apparatuses in Example 3 and comparative examples 1-7 of the present disclosure. In FIG. 14, comparative example 2 lacks simulation results because the simulation thereof cannot converge toward a reliable value. In FIGS. 12-14, the trends of the total amount of processed gas and the regeneration energy consumption regarding Example 3 and comparative examples 1-7 is similar to that shown in FIG. 11.

One skilled in the art falls into a technical myth, and has deemed that effective removal of $CO_2$ from exhaust gas is the major point to reform or mitigate the global warming, and therefore the $CO_2$ capture percentage is considered as the most important factor. The inventors of the present disclosure, however, have found that the $CO_2$ capture percentage should not be the key point to reform or mitigate the global warming, and pursuing a high $CO_2$ capture percentage is not a right direction. Specifically, the absorbent used to absorb $CO_2$ should be regenerated in order to make the process consistent with the environmentally-friendly requirement. However, regenerating absorbent must consume additional energy, and in order to supply the required energy for regenerating absorbent, $CO_2$ is inevitably by-produced. The more the energy of regenerating the absorbent requires, the more $CO_2$ is produced. In view of the overall effect, $CO_2$ is removed from exhaust gas in one place, but in another place $CO_2$ is inevitably produced to generate the required energy for regenerating the absorbent. In view of the above, when evaluating the overall effect of $CO_2$ removal, the regeneration energy consumption of the absorbent must be taken into account in order to achieve an objective and rational conclusion. If only $CO_2$ capture percentage is taken into account, it cannot properly evaluate the merits of a particular technique. On the other hand, the regeneration energy consumption of absorbent also implies the operating cost of the apparatus. The more the energy of regenerating absorbent requires, the more the operating expenses needs.

Accordingly, in comprehensive consideration of both the regeneration energy consumption of the absorbent and the amount of processed gas, Example 3 is a preferred approach, and comparative example 5 is not.

Figure 15:
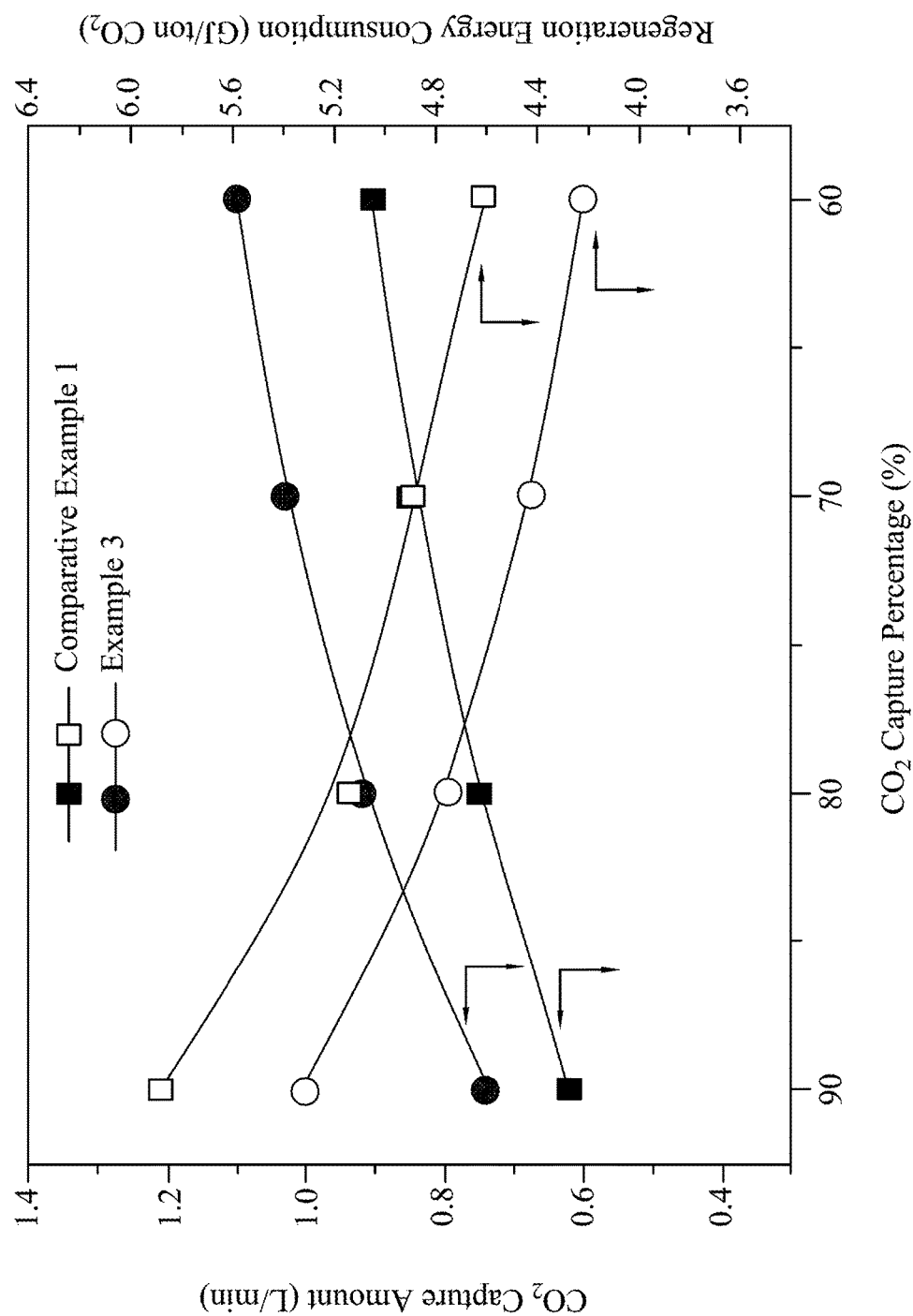
FIG. 15 is a diagram showing the $CO_2$ capture amounts and regeneration energy consumptions of Example 3 and comparative example 1 at different $CO_2$ capture percentages.

In addition, an important phenomenon has been found. Both Example 3 and comparative example 1 use RPB unit(s) to absorb $CO_2$ and possess the same volume of the packed bed, but the total amount of processed gas and the regeneration energy consumption of Example 3 are unexpectedly better than that of comparative example 1. FIG. 15 is a diagram showing the $CO_2$ capture amounts and regeneration energy consumptions of Example 3 and comparative example 1 at different $CO_2$ capture percentages. When $CO_2$ capture percentage is, ranged from 60% to 90%, the regeneration energy consumption of Example 3 is less than that of comparative example 1, and further the total amount of processed gas of Example 3 is greater than that of comparative example 1. FIG. 15 further shows another important phenomenon. When $CO_2$ capture percentage increases, $CO_2$ capture amount inversely decreases. This phenomenon is because the total amount of processed gas must be reduced in order to achieve a high $CO_2$ capture percentage. In addition, when $CO_2$ capture percentage increases, the regeneration energy consumption increases as well. For example, when $CO_2$ capture percentage is 60%, both Example 3 and comparative example 1 show relatively higher $CO_2$ capture amounts and relatively lower regeneration energy consumptions. The data provided in FIG. 15 adequately supports the viewpoint that operating or designing apparatuses of absorbing $CO_2$ at a relatively higher $CO_2$ capture percentage is not a good approach.

Comparative Example 8

Figure 10:
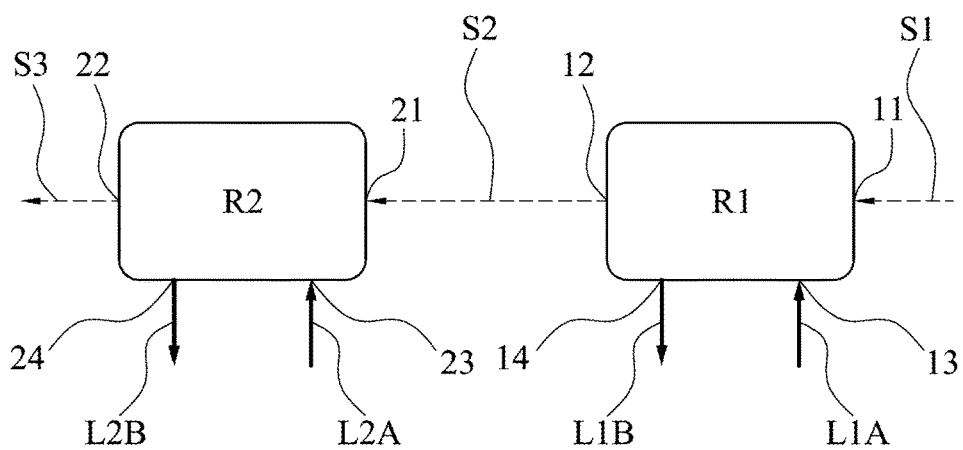

In US patent publication No. 2013/0319235, an apparatus of absorbing $CO_2$ including two RPB units is provided. FIG. 10 is a diagram illustrating a model C8 established according to said US patent application. The model C8 includes a RPB unit R1 and a RPB unit R2. The gas stream S1 to be processed passes through the RPB unit R1 and the RPB unit R2 sequentially, but each of the RPB units R1 and R2 has an independent piping for supplying liquid absorbent. Specifically, the gas stream S1 is supplied into the RPB unit R1 from a first gas inlet 11, and then exits the RPB unit R1 from a first gas outlet 12. Gas stream S2, having passed through the RPB unit R1, is transported into the RPB unit R2 from a second gas inlet 21, and $CO_2$ in the gas stream is absorbed once again in the RPB unit R2. In addition, gas stream S3 having processed by the RPB unit R2 exits from second gas outlet 22. On the other hand, a liquid absorbent L1A is supplied into the RPB unit R1 from a first absorbent inlet 13, and the liquid absorbent having absorbed $CO_2$ (indicated as "L1B") exits the RPB unit R1 from a first absorbent outlet 14. Similarly, a liquid absorbent L2A is supplied into the RPB unit R2 from the second absorbent inlet 23, and the liquid absorbent having absorbed $CO_2$ (indicated as "L2B") exits the RPB unit R2 from a second absorbent outlet 24.

The total amount of processed gas and the $CO_2$ loading of the liquid absorbents L1B and L2B were simulated and calculated using the "6-tank in series model" at $CO_2$ capture percentage of 90% (based on the gas stream S1), and then the regeneration energy consumptions of the liquid absorbents L1B and L2B were simulated and calculated using the software "Aspen Plus" aforementioned. Other simulation parameters are the same as Example 3. The simulation results of comparative example 8 are summarized in Table 3 below, and the simulation results of Example 3 are summarized in Table 4 below.

TABLE 3

|  | US 2013/0319235 (model C8) |
|---|---|
| $CO_2$ loading of liquid absorbent L1A of R1 (mol $CO_2$/mol MEA) | 0.345 |
| $CO_2$ loading of liquid absorbent L2A of R2 (mol $CO_2$/mol MEA) | 0.345 |
| Flow rate of liquid absorbent L1A of R1 (mL/min) | 50 |
| Flow rate of liquid absorbent L2A of R2 (mL/min) | 50 |
| $CO_2$ loading of liquid absorbent L1B (mol $CO_2$/mol MEA) | 0.422 |
| C $O_2$ loading of liquid absorbent L2B (mol C $O_2$/mol MEA) | 0.372 |
| Regeneration energy consumption (GJ/ton $CO_2$) | 7.9 |
| Total amount of processed gas (L/min) | 10 |
| $CO_2$ capture amount (L/min) | 0.91 |

TABLE 4

|  | Example 3 |
|---|---|
| $CO_2$ loading of liquid absorbent L1 (mol $CO_2$/mol MEA) | 0.345 |
| Flow rate of liquid absorbent L1 (mL/min) | 50 |
| $CO_2$ loading of liquid absorbent L2 (mol $CO_2$/mol MEA) | 0.392 |
| $CO_2$ loading of liquid absorbent L3 (mol $CO_2$/mol MEA) | 0.430 |
| Flow rate of first gas stream S1 (L/min) | 4.6 |
| Flow rate of second gas stream S2 (L/min) | 3.6 |
| Regeneration energy consumption (GJ/ton $CO_2$) | 5.32 |
| Total amount of processed gas (S1 + S2) (L/min) | 8.2 |
| $CO_2$ capture amount (L/min) | 0.74 |

In Table 3 and Table 4, the total amount of processed gas and the $CO_2$ capture amount of model C8 are respectively 10 L/min and 0.91 L/min, whereas total amount of processed gas and the $CO_2$ capture amount of Example 3 are respectively 8.2 L/min and 0.74 L/min. The regeneration energy consumption of model C8 is 7.9 GJ/ton $CO_2$, whereas the regeneration energy consumption of Example 3 is 5.32 GJ/ton $CO_2$. The total amount of processed gas and the CO2 capture amount of model C8 is 22% more than that of Example 3 of the present disclosure, but the regeneration energy consumption of model C8 is 48% more than that of Example 3. In comprehensive consideration of both the regeneration energy consumption of the absorbent and the amount of processed gas, the apparatus of Example 3 of the present disclosure is more excellent than that provided in the US patent publication No. 2013/0319235.

Although the first and second RPB units R1, R2 in Examples 1-3 are of identical volume, the present disclosure is not limited thereto. In other embodiments, the volumes of the packed beds in the first and second RPB units R1, R2 may be different from each other, and that may be modulated depending upon the numerous design possibilities.

Figure 16:
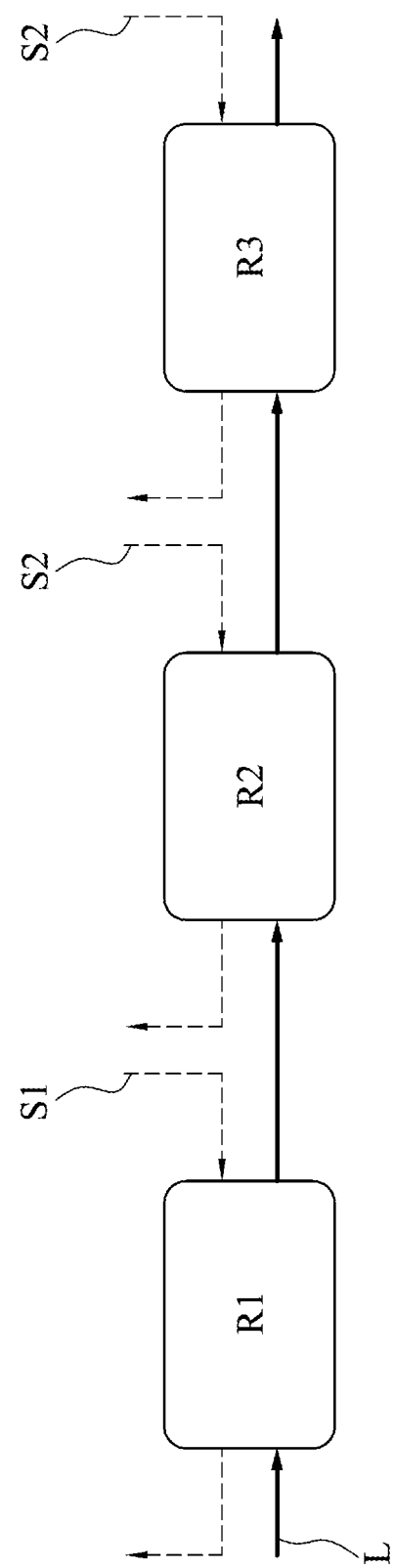
FIG. 16 is schematic diagram illustrating an apparatus for absorbing a component gas from a gas mixture according to some embodiments of the present disclosure.

In addition, according to yet some embodiments of the present disclosure, the apparatus E1 may include three or more RPB units, as shown in FIG. 16. The apparatus E1 includes a RPB unit R1, a RPB unit R2, and a RPB unit R3. The RPB units R1, R2, R3 respectively process a first gas stream S1, a second gas stream S2, and a third gas stream S3. A liquid absorbent L passes through the first, the second and the third RPB units R1, R2, R3 in sequence to absorb the $CO_2$ in the first gas stream S1, the second gas stream S2 and the third gas stream S3.

Figure 17:
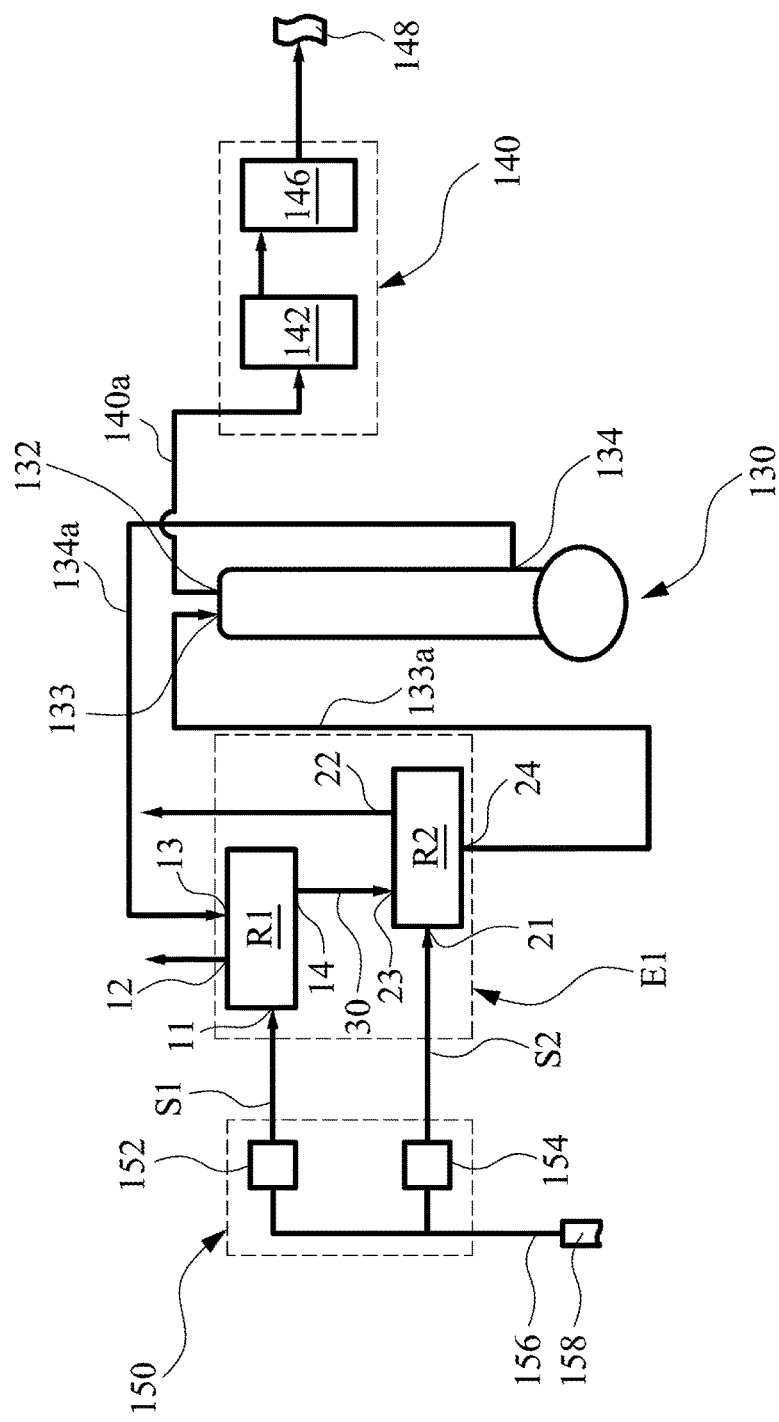
FIG. 17 is schematic diagram illustrating an apparatus for absorbing a component gas from a gas mixture according to some embodiments of the present disclosure.

FIG. 17 is a diagram schematically illustrating an apparatus 100 of absorbing a component gas from a gas mixture according to some embodiments of the present disclosure. The apparatus 100 includes the apparatus E1 described hereinbefore and a regenerating unit 130. The regenerating unit 130 is configured to remove at least a portion of $CO_2$ from a liquid absorbent, and thus obtaining a regenerated liquid absorbent. The regenerating unit 130 includes an absorbent inlet 133 and an absorbent outlet 134. The absorbent inlet 133 is connected to the second absorbent outlet 24 of the second RPB unit R2 through piping 133a so that the liquid absorbent passing through the second RPB unit R2 is transported to the regenerating unit 130. The regenerated liquid absorbent is transported to the first absorbent inlet 13 of the first RPB unit R1 from the absorbent outlet 134 through piping 134a. In one embodiment, the regenerating unit 130, for example, may be a stripping column (i.e., stripper) or another RPB unit configured for converting at least a portion of $CO_2$ absorbed by the liquid absorbent into gaseous $CO_2$, and thereby obtaining a recovered $CO_2$ gas. In this embodiment, the regenerating unit 130 may further include a gas outlet 132 for discharging the recovered $CO_2$ gas.

In some embodiments, the apparatus 100 further includes a purification unit 140 which is connected to the gas outlet 132 of the regenerating unit 130 through piping 140a. The purification unit 140 is configured for purifying the recovered $CO_2$ gas. In some embodiments, the purification unit 140 may include an absorbent removing unit 142 and a drying unit 146 as the recovered $CO_2$ gas possibly contains a small amount of the absorbent and water. The absorbent removing unit 142 is connected to the gas outlet 132 of the regenerating unit 130. The recovered $CO_2$ gas transported from the regenerating unit 130 sequentially passes through the absorbent removing unit 142 and the drying unit 146. The absorbent removing unit 142, for example, may be a water scrubber or a washing tower, in which the absorbent existed in the recovered $CO_2$ gas is absorbed by water. Thereafter, in the drying unit 146, water existed in the recovered $CO_2$ gas is removed, and thereby obtaining high-purity $CO_2$ gas. The obtained high-purity $CO_2$ gas is transported to a piping 148.

In some embodiments, the apparatus 100 further includes a gas distribution unit 150 connected with the first gas inlet 11 of the first RPB unit R1 and the second gas inlet 21 of the second RPB unit R2. The gas distribution unit 150 is configured to distribute a gas stream to be processed from piping 156 into a first gas stream S1 and a second gas stream S2. In one embodiment, the gas distribution unit 150 includes a first blower 152 and a second blower 154, and the pressure and the volumetric flow rates of the first and the second gas streams S1, S2 may be managed by controlling the first and second blowers 152, 154. In another embodiment, the first gas inlet 11 and the second gas inlet 21 are connected with the same gas supplier 158, and the composition of the first gas stream S1 is the same as that of the second gas stream S2. In other embodiments, the first gas inlet 11 and second gas inlet 21 may be connected to different gas suppliers, and thus the composition of the first gas stream S1 may be different from that of the second gas stream S2.

According to another aspect of the present disclosure, a method for absorbing $CO_2$ from a gas mixture is provided. In various embodiments, the method for absorbing $CO_2$ from an exhaust gas includes providing or receiving an apparatus E1 including a first RPB unit R1 and a second RPB unit R2, as illustrated in FIG. 1. The first RPB unit R1 includes a first RPB, a first gas inlet 11, a first gas outlet 12, a first $CO_2$-absorbent inlet 13, and a first $CO_2$-absorbent outlet 14. Similarly, the second RPB unit includes a second RPB, a second gas inlet 21, a second gas outlet 22, a second $CO_2$-absorbent inlet 23 and a second $CO_2$-absorbent outlet 24. It is noted that the first $CO_2$-absorbent outlet 14 of the first RPB unit is connected to and communicated with the second $CO_2$-absorbent inlet 23 of the second RPB unit.

The method includes an operation of transporting a first gas stream S1 containing $CO_2$ from the first gas inlet 11 through the first RPB to the first gas outlet 12. The first gas stream S1 has a first $CO_2$ volumetric percentage ranged from 1 vol % to 30 vol %, such as for example 5 vol %, 10 vol %, 15 vol %, 20 vol %, and 25 vol %.

The method further includes an operation of transporting a second gas stream S2 containing $CO_2$ from the second gas inlet 21 through the second RPB to the second gas outlet 22. The second gas stream S2 has a second $CO_2$ volumetric percentage ranged from 1 vol % to 30 vol %, such as for example 5 vol %, 10 vol %, 15 vol %, 20 vol %, and 25 vol %.

In some embodiments, the first gas stream S1 has a first $CO_2$ molar flow rate, and the second gas stream S2 has a second $CO_2$ molar flow rate, and the second $CO_2$ molar flow rate is less than or substantially equal to the first $CO_2$ molar flow rate of the first gas stream S1. The term "$CO_2$ molar flow rate" herein refers to the $CO_2$ molar number being transported per unit time, and may have unit such as for example $CO_2$ mol/second or $CO_2$ mol/minutes. According to some examples, the second $CO_2$ molar flow rate of the second gas stream S2 may be 50-100% of the first $CO_2$ molar flow rate of the first gas stream S1. When the second $CO_2$ molar flow rate is greater than a certain level (e.g., greater than the first $CO_2$ molar flow rate), the overall CO2 capture amount is unsatisfactory according to some examples. When the second $CO_2$ molar flow rate is less than a certain level (e.g., less than 50% of the first $CO_2$ molar flow rate), the overall CO2 capture amount and the regeneration energy consumption are unsatisfactory according to yet some examples. Therefore, the second $CO_2$ molar flow rate may be about 60%, about 70%, about 80%, about 90%, about 95%, or 100% of the first $CO_2$ molar flow rate.

In yet some embodiments, the first gas stream and the second gas stream respectively have a first $CO_2$ concentration and a second $CO_2$ concentration, and the second $CO_2$ concentration is substantially equal to the first $CO_2$ concentration. In examples, the first gas stream and the second gas stream have the same composition and are produced by the same exhaust source.

The method further includes an operation of transporting a $CO_2$-absorbent L1 from the first $CO_2$-absorbent inlet 13 through the first RPB, the first $CO_2$-absorbent outlet 14, the second $CO_2$-absorbent inlet 23 and the second RPB to the second $CO_2$-absorbent outlet 24 in this sequence. The $CO_2$-absorbent absorbs the $CO_2$ in the first and the second gas streams S1, S2, and therefore produces a $CO_2$-absorbed absorbent L3.

The method further includes an operation of regenerating the $CO_2$-absorbed absorbent L3 discharged from the second $CO_2$-absorbent outlet 24. The operation of regenerating the $CO_2$-absorbed absorbent includes converting a portion of the absorbed $CO_2$ in the $CO_2$-absorbed absorbent into gaseous $CO_2$ to produce a regenerated $CO_2$-absorbent.

In some embodiments, the regeneration of the $CO_2$-absorbed absorbent may be implemented by a third RPB unit. Specifically, the regeneration of the $CO_2$-absorbed absorbent includes the steps of (i) transporting the $CO_2$-absorbent into the third RPB unit; and (ii) introducing a gaseous regenerant into the third RPB unit to convert the absorbed $CO_2$ in the $CO_2$-absorbed absorbent into gaseous $CO_2$ so as to produce the regenerated $CO_2$-absorbent. Alternatively, according to yet some embodiments, the regeneration of the $CO_2$-absorbed absorbent may be implemented by using a stripping column to convert the absorbed $CO_2$ in the $CO_2$-absorbed absorbent into gaseous $CO_2$ to produce the regenerated $CO_2$-absorbent.

The method further includes an operation of transporting the regenerated $CO_2$-absorbent to the first $CO_2$-absorbent inlet 13 of the first RPB unit R1.

According to some embodiments, in the method disclosed herein, the first RPB unit and the second RPB unit are operated to have a first $CO_2$ capture percentage and a second $CO_2$ capture percentage respectively with respect to the first and second gas streams. Both the first $CO_2$ capture percentage and the second $CO_2$ capture percentage are greater than 60%, specifically 60-95%, such as for example approximately 70%, approximately 80%, and approximately 90%.

In some embodiment, the first gas stream has a first gas volumetric flow rate, the $CO_2$-absorbent has a liquid volumetric flow rate throughout the first and second RPB units, and the ratio of the first gas volumetric flow rate to the liquid volumetric flow rate ranges from 30 to 300. When the ratio of the first gas volumetric flow rate to the liquid volumetric flow rate is greater than a certain level (e.g., 300), the difficulties of operation is unfavorably increased. To the contrary, when the ratio of the first gas volumetric flow rate to the liquid volumetric flow rate is less than a certain level (e.g., 30), the overall $CO_2$ capture amount and the regeneration energy consumption are unsatisfactory. According to some examples, the ratio of the first gas volumetric flow rate to the liquid volumetric flow rate may be 50, 80, 120, 160, 200, 240, or 280. Similarly, the ratio of the second gas volumetric flow rate of the second gas stream to the liquid volumetric flow rate of the $CO_2$-absorbent ranges from 30 to 300, such as for example 50, 80, 120, 160, 200, 240, and 280.

Accordingly to some embodiment, the method of absorbing $CO_2$ disclosed herein uses two RPB units only (i.e., a first RPB unit R1 and a second RPB unit R2) to absorb $CO_2$ from a gas mixture. In other words, the $CO_2$-absorbent absorbs $CO_2$ only in the first RPB unit and the second RPB unit. In some examples, when three or more RPB units are used, as shown in FIG. 16, the overall operation efficiency may be decreased.

It will be apparent to those skilled in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims and their equivalents.

What is claimed is:

1. A method for absorbing $CO_2$ from a gas mixture, comprising:
    providing or receiving a first rotating packed bed (RPB) unit comprising a first RPB, a first gas inlet, a first gas outlet, a first $CO_2$-absorbent inlet, and a first $CO_2$-absorbent outlet, and a second RPB unit comprising a second RPB, a second gas inlet, a second gas outlet, a second $CO_2$-absorbent inlet and a second $CO_2$-absorbent outlet, wherein the first $CO_2$-absorbent outlet of the first RPB unit is connected to the second $CO_2$-absorbent inlet of the second RPB unit;

transporting a first gas stream containing $CO_2$ from the first gas inlet through the first RPB to the first gas outlet, wherein the first gas stream has a first $CO_2$ molar flow rate and a first $CO_2$ volumetric percentage ranged from 1 vol % to 30 vol %;

transporting a second gas stream containing $CO_2$ from the second gas inlet through the second RPB to the second gas outlet, wherein the second gas stream has a second $CO_2$ molar flow rate and a second $CO_2$ volumetric percentage ranged from 1 vol % to 30 vol %, and the second gas is being transported to the second RPB at the second $CO_2$ molar flow rate which is 60-80% of the first $CO_2$ molar flow rate of the first gas stream being transported to the first RPB;

transporting a $CO_2$-absorbent from the first $CO_2$-absorbent inlet through the first RPB, the first $CO_2$-absorbent outlet, the second $CO_2$-absorbent inlet and the second RPB to the second $CO_2$-absorbent outlet in sequence such that the $CO_2$-absorbent absorbs the $CO_2$ in the first and the second gas streams, thereby generating a $CO_2$-absorbed absorbent;

regenerating the $CO_2$-absorbed absorbent discharged from the second $CO_2$-absorbent outlet, wherein the regenerating the $CO_2$-absorbed absorbent comprises converting a portion of the absorbed $CO_2$ in the $CO_2$-absorbed absorbent into gaseous $CO_2$ to produce a regenerated $CO_2$-absorbent; and transporting the regenerated $CO_2$-absorbent to the first $CO_2$-absorbent inlet.

2. The method according to claim 1, further comprising operating the first RPB unit and the second RPB unit to respectively have a first $CO_2$ capture percentage and a second $CO_2$ capture percentage with respect to the first gas stream and the second gas stream, and both the first $CO_2$ capture percentage and the second $CO_2$ capture percentage are greater than 60%.

3. The method according to claim 1, wherein the first gas stream has a first $CO_2$ concentration, and the second gas stream has a second $CO_2$ concentration that is substantially equal to the first $CO_2$ concentration of the first gas stream.

4. The method according to claim 3, wherein the first gas stream and the second gas stream are produced by a same exhaust source.

5. The method according to claim 1, wherein the regenerating the $CO_2$-absorbed absorbent discharged from the second $CO_2$-absorbent outlet comprises:

transporting the $CO_2$-absorbent into a third RPB unit; and
introducing a gaseous regenerant into the third RPB unit to convert the absorbed $CO_2$ in the $CO_2$-absorbed absorbent into gaseous $CO_2$ to produce the regenerated $CO_2$-absorbent.

6. The method according to claim 1, wherein the regenerating the $CO_2$-absorbed absorbent discharged from the second $CO_2$-absorbent outlet comprises using a stripping column to convert the absorbed $CO_2$ in the $CO_2$-absorbed absorbent into gaseous $CO_2$ to produce the regenerated $CO_2$-absorbent.

7. The method according to claim 1, wherein the first gas stream has a first gas volumetric flow rate, the $CO_2$-absorbent has a liquid volumetric flow rate throughout the first and second RPB units, and the ratio of the first gas volumetric flow rate to the liquid volumetric flow rate ranges from 30 to 300.

8. The method according to claim 1, wherein the second gas stream has a second gas volumetric flow rate, the $CO_2$-absorbent has a liquid volumetric flow rate throughout the first and second RPB units, and the ratio of the second gas volumetric flow rate to the liquid volumetric flow rate ranges from 30 to 300.

9. The method according to claim 1, wherein the $CO_2$-absorbent absorbs $CO_2$ only in the first RPB unit and the second RPB unit.

10. The method according to claim 1, wherein the $CO_2$-absorbed absorbent at the second $CO_2$-absorbent outlet has a $CO_2$ loading ranged from 86% to 95% of a saturated $CO_2$ loading of the $CO_2$-absorbent.

11. A method for absorbing $CO_2$ from a gas mixture, comprising:

providing or receiving a first rotating packed bed (RPB) unit comprising a first RPB, a first gas inlet, a first gas outlet, a first $CO_2$-absorbent inlet, and a first $CO_2$-absorbent outlet, and a second RPB unit comprising a second RPB, a second gas inlet, a second gas outlet, a second $CO_2$-absorbent inlet and a second $CO_2$-absorbent outlet, wherein the first $CO_2$-absorbent outlet of the first RPB unit is connected to the second $CO_2$-absorbent inlet of the second RPB unit;

transporting a first gas stream containing $CO_2$ from the first gas inlet through the first RPB to the first gas outlet, wherein the first gas stream has a first $CO_2$ molar flow rate and a first $CO_2$ volumetric percentage ranged from 1 vol % to 30 vol %;

transporting a second gas stream containing $CO_2$ from the second gas inlet through the second RPB to the second gas outlet, wherein the second gas stream has a second $CO_2$ molar flow rate and a second $CO_2$ volumetric percentage ranged from 1 vol % to 30 vol %;

transporting a $CO_2$-absorbent from the first $CO_2$-absorbent inlet through the first RPB, the first $CO_2$-absorbent outlet, the second $CO_2$-absorbent inlet and the second RPB to the second $CO_2$-absorbent outlet in sequence such that the $CO_2$-absorbent absorbs the $CO_2$ in the first and the second gas streams, thereby generating a $CO_2$-absorbed absorbent, wherein the second gas is being transported to the second RPB at the second $CO_2$ molar flow rate which is 60-80% of the first $CO_2$ molar flow rate of the first gas stream being transported to the first RPB, such that the $CO_2$-absorbed absorbent at the second $CO_2$-absorbent outlet has a $CO_2$ loading ranged from 86% to 95% of a saturated $CO_2$ loading of the $CO_2$-absorbent;

regenerating the $CO_2$-absorbed absorbent discharged from the second $CO_2$-absorbent outlet, wherein the regenerating the $CO_2$-absorbed absorbent comprises converting a portion of the absorbed $CO_2$ in the $CO_2$-absorbed absorbent into gaseous $CO_2$ to produce a regenerated $CO_2$-absorbent; and transporting the regenerated $CO_2$-absorbent to the first $CO_2$-absorbent inlet.

12. The method according to claim 11, wherein the regenerating the $CO_2$-absorbed absorbent discharged from the second $CO_2$-absorbent outlet comprises:

transporting the $CO_2$-absorbent into a third RPB unit; and
introducing a gaseous regenerant into the third RPB unit to convert the absorbed $CO_2$ in the $CO_2$-absorbed absorbent into gaseous $CO_2$ to produce the regenerated $CO_2$-absorbent.

13. The method according to claim 1, wherein the regenerating the $CO_2$-absorbed absorbent discharged from the second $CO_2$-absorbent outlet comprises using a stripping column to convert the absorbed $CO_2$ in the $CO_2$-absorbed absorbent into gaseous $CO_2$ to produce the regenerated $CO_2$-absorbent.

14. The method according to claim 1, wherein the first gas stream has a first gas volumetric flow rate, the $CO_2$-absorbent has a liquid volumetric flow rate throughout the first and second RPB units, and the ratio of the first gas volumetric flow rate to the liquid volumetric flow rate ranges from 30 to 300.

\* \* \* \* \*